US012691534B2

(12) United States Patent
    Filippini

(10) Patent No.:    US 12,691,534 B2
(45) Date of Patent:         Jul. 28, 2026

(54) BLANKHOLDER FOR A WELDING APPARATUS, AND WELDING APPARATUS COMPRISING SAID BLANKHOLDER

(71) Applicants: CASTELLINI OFFICINE MECCANICHE S.R.L., Cazzago San Martino (IT); FINCANTIERI S.P.A., Trieste (IT)

(72) Inventor: Piermarcello Filippini, Rovato (IT)

(73) Assignees: FINCANTIERI S.P.A., Trieste (IT); CASTELLINI S.P.A. SOCIETÀ BENEFIT, Brescia (IT)

( * ) Notice: Subject to any disclaimer, the term of this patent is extended or adjusted under 35 U.S.C. 154(b) by 779 days.

(21) Appl. No.: 18/297,714

(22) Filed: Apr. 10, 2023

(65) Prior Publication Data
    US 2023/0330789 A1      Oct. 19, 2023

(30) Foreign Application Priority Data
    Apr. 13, 2022    (EP) ..................................... 22425018

(51) Int. Cl.
    B23K 37/04         (2006.01)
    B23K 101/18        (2006.01)
(52) U.S. Cl.
    CPC ...... B23K 37/0435 (2013.01); B23K 2101/18 (2018.08)
(58) Field of Classification Search
    CPC .............. B23K 20/126; B23K 37/0408; B23K 37/0435; B23K 2103/04; B23K 11/115; B23K 2101/18; B21D 22/22
    See application file for complete search history.

(56) References Cited

U.S. PATENT DOCUMENTS

| | | | |
|---|---|---|---|
| 6,070,781 A | 6/2000 | Johson et al. | |
| 6,417,490 B1 * | 7/2002 | Liebrecht ............... | B21J 15/025 |
| | | | 219/157 |
| 7,641,098 B2 * | 1/2010 | Weil ................... | B23K 37/0535 |
| | | | 228/49.4 |
| 9,962,799 B2 * | 5/2018 | Hascoet ............. | B23K 26/0884 |

(Continued)

OTHER PUBLICATIONS

European Search Report for EP Patent Application No. 22425018.3, Nov. 8, 2022, 5 pages.

*Primary Examiner* — Courtney D Heinle
*Assistant Examiner* — Andrew Thanh Bui
(74) *Attorney, Agent, or Firm* — Armstrong Teasdale LLP

(57)            ABSTRACT

A blankholder for a welding apparatus has an upper gripping element and a lower gripping element having longitudinal development along a longitudinal direction. The upper gripping element is movable between a closed position in which a panel is clamped between the upper and lower gripping elements and an open position in which the panel is slidable between the upper and lower gripping elements. The lower gripping element has a lower operating surface facing the upper gripping element and a plurality of movable plates. The movable plates are movable in a direction substantially perpendicular to the lower operating surface between a first position in which the movable plates do not protrude or protrude by a minimum height relative to the lower operating surface and a second position in which the movable plates protrude with respect to the lower operating surface by a predetermined maximum height and have a gripping surface.

12 Claims, 10 Drawing Sheets

(56)　　　　　　References Cited

U.S. PATENT DOCUMENTS

2009/0159579　A1　　6/2009　Nishio et al.
2020/0078846　A1\*　3/2020　Zhou ...................... B21D 24/16
2023/0070558　A1\*　3/2023　Han .......................... B25B 5/06

\* cited by examiner

18

182

184

20

18

182            184

20

BLANKHOLDER FOR A WELDING APPARATUS, AND WELDING APPARATUS COMPRISING SAID BLANKHOLDER

CROSS-REFERENCE TO RELATED APPLICATION

This application claims priority to European Patent Application No. 22425018.3 filed Apr. 13, 2022, the entire contents of which is hereby incorporated in its entirety by reference.

FIELD OF THE INVENTION

The present invention relates to a blankholder for a welding apparatus, and a welding apparatus comprising said blankholder. In particular, the present invention relates to a blankholder and an associated welding apparatus for welding panels with different thicknesses to each other.

PRIOR ART

As is known, when welding sheet metal, it is often necessary to weld edges of different thicknesses together.

For example, in laser welding, which is carried out on just one side of the panels, it is known to set up the welding apparatus with a special type of blankholder. Since the blankholder has a fixed reference (reference on which the surface of the panel to be welded rests) and a movable reference, it may adapt to a given range of possible panel thicknesses.

In this type of processing, the thicknesses of the panels that may be welded together may be wide-ranging, for example, panel thicknesses may vary from 5 mm to 25 mm. However, welding may also be done with different thicknesses, for example less or more than the range indicated above.

The system of the prior art, although widely used and appreciated, is not devoid of drawbacks.

First, the blankholder of the prior art does not allow for effective clamping of a panel, the edge of which has a variable thickness. For example, the panel may be the result of a previous weld between two panels of different thickness. In this case, the edge offered for welding, which must be clamped by the blankholder, does not have a constant thickness, and therefore the blankholder can only handle the greatest thickness.

The prior art has tried to remedy this drawback with temporary support structures to be interposed between the blankholder and the surface of the panel where the thickness is less.

It is also known to make the means fixed, while the upper gripping element is movable and adaptable to the actual thickness of the panel. In this way, however, the coplanar surfaces between the two panels on which the weld is actually made are the bottom surfaces of the panels. Since welding must be carried out from the bottom up, the arrangement of the equipment and the work itself are particularly complex to manage.

In any case, the technical solution of the prior art just described does not allow for a solution to the problem related to the welding of panels having edges to be welded with two or more different thicknesses, when the upper surface is to be kept coplanar.

Thus, the technical solutions proposed by the prior art do not provide a technically and economically satisfactory procedure.

SUMMARY OF THE INVENTION

The need to solve the drawbacks and limitations mentioned with reference to the prior art is therefore felt.

Thus, there is a need to provide a blankholder for a welding apparatus that may adapt easily also to the case wherein the panel has a variable thickness.

In addition, there is a need for a blankholder that allows the surfaces of the panels to be aligned on the upper side and not on the lower side, as is the case with apparatuses of the prior art.

There is also a need to provide a blankholder for a welding apparatus that may automatically adapt to panels of varying thickness, for example with two or more different thicknesses at the edge to be welded with another panel while keeping the top surface coplanar.

In addition, there is a need for a panel welding apparatus that comprises a blankholder with the features mentioned above.

These needs are at least partially satisfied by a blankholder for a welding apparatus and a welding apparatus as described and claimed herein.

DESCRIPTION OF THE DRAWINGS

Further features and advantages of the present invention will be more readily understood from the following description of its preferred and non-limiting examples of embodiments, wherein.

Elements or parts of elements common to the embodiments described hereinafter will be indicated with the same reference numerals.

DETAILED DESCRIPTION

Figure 5:
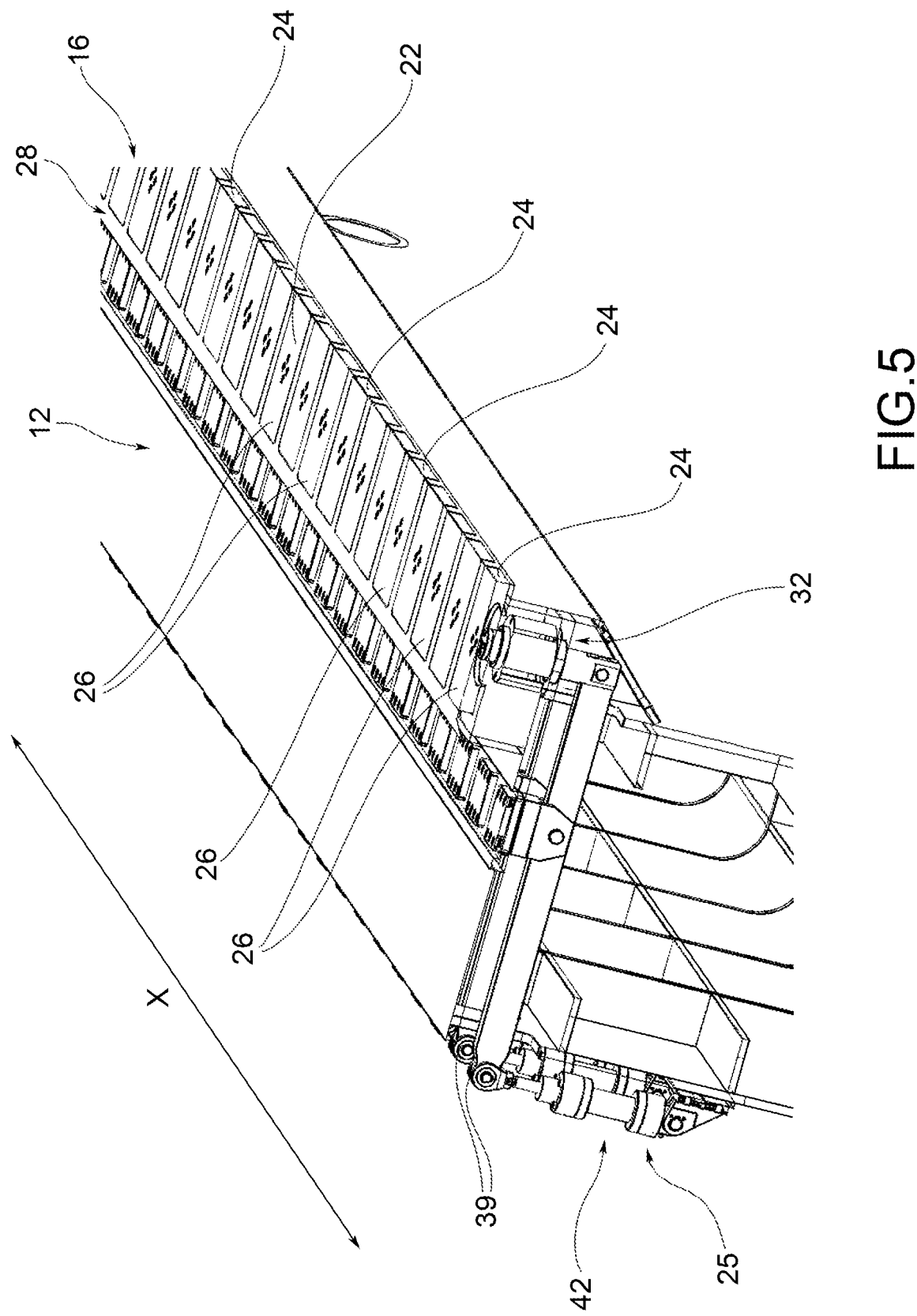
FIG. 5 shows schematically a perspective view of a lower portion of a blankholder according to the present invention.

In FIG. 5, a blankholder for a welding apparatus according to the present invention is denoted with the general reference 12.

Figure 9:
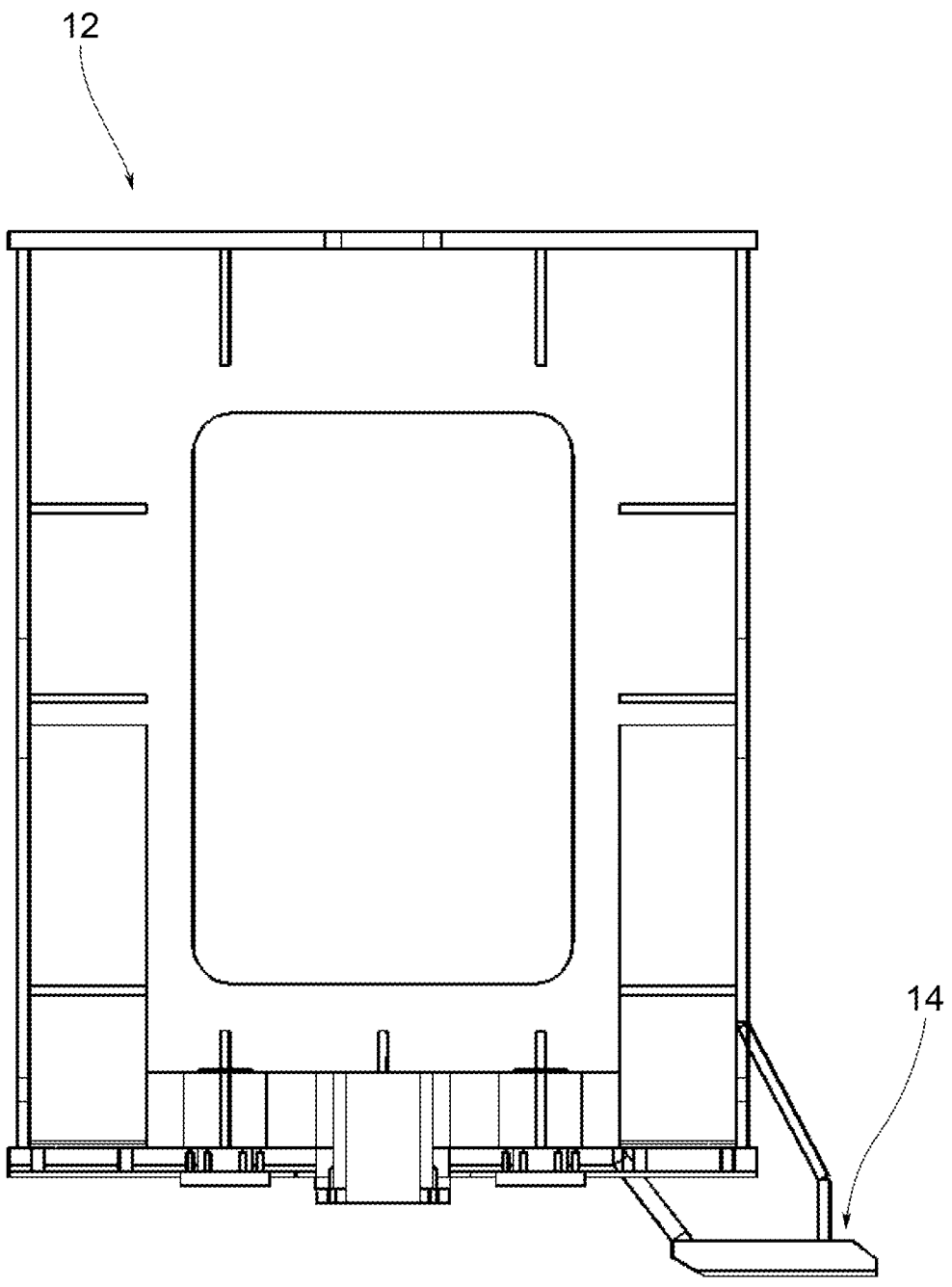
FIG. 9 shows schematically a cross-sectional side view of an upper portion of a blankholder according to the present invention.

The blankholder 12 comprises an upper gripping element 14 (visible, for example, in FIG. 9) and a lower gripping element 16 having longitudinal development along a longitudinal direction X. In specific technical jargon, the upper gripping element 14 and the lower gripping element 16 are also referred to as the upper crossbar and the lower crossbar, respectively. The longitudinal direction X is substantially the direction along which the upper gripping element 14 and the lower gripping element 16 extend.

The upper gripping element 14 and the lower gripping element 16 are movable relative to each other between a closed position, wherein a panel 18, 20 is clamped between the upper gripping element 14 and the lower gripping element 16, and an open position, wherein the panel 18, 20 may slide between the upper gripping element 14 and the lower gripping element 16.

The lower gripping element 16 comprises a lower operating surface 22 facing the upper gripping element 14. Further, the lower gripping element 16 comprises a plurality of movable plates 24, arranged with a gripping surface 26, along the longitudinal direction X, and suitable to be moved, each independently of the others, by handling members 25 in a direction substantially perpendicular to the lower operating surface 22, between:

a first position, wherein they do not protrude or protrude a minimum height from the lower operating surface 22, and a second position, wherein they protrude from the lower operating surface 22 by a predetermined maximum height.

In other words, the lower gripping element 16 is arranged with an array of movable plates 24 suitable for adjusting the actual gripping surface of the lower gripping element 16.

By this technical solution, the gripping distance between the upper gripping element 14 and the movable plates 24 of the lower gripping element 16 is therefore adjustable. In the closed position, the upper gripping element 14 is always at the same height as the corresponding upper gripping element 14 of a second blankholder that grips the second panel to be welded.

According to a possible embodiment, the upper gripping element 14 is movable in approach and departure from the lower gripping element 16 to allow the panels to slide.

In alterative embodiments, the upper gripping element 14 may be fixed, assigning the clamping of the panel to the lower gripping element 16 and/or the movable plates 24.

According to a possible embodiment, in the first position, the gripping surface 26 of the movable plates 24 may be substantially aligned with the lower operating surface 22 of the lower gripping element 16.

In alternative embodiments, the gripping surface 26 of the movable plates 24 may be in a retracted position relative to the lower operating surface 22 of the lower gripping element 16, or protrude therefrom by a predetermined height.

Figure 6:
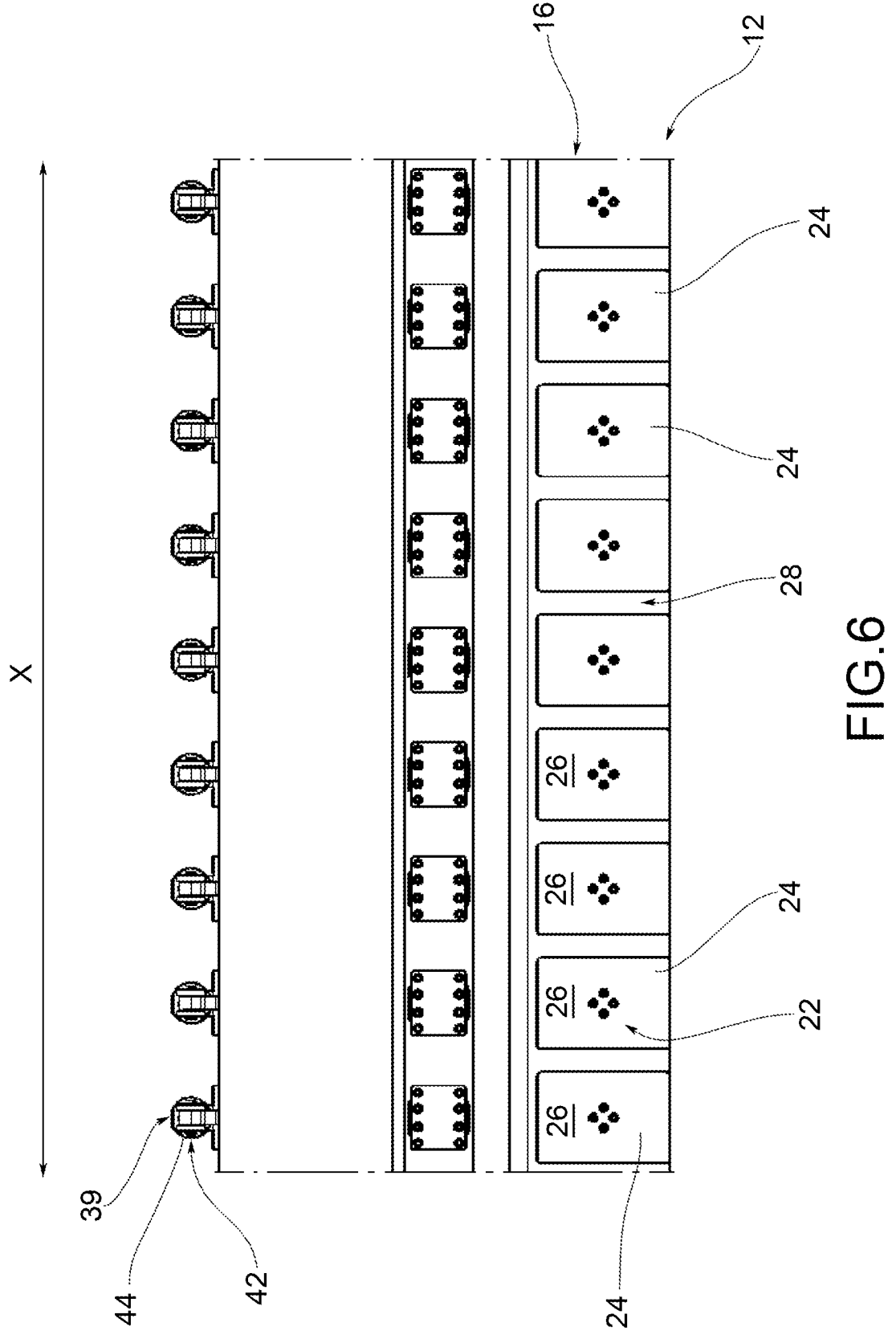
FIG. 6 shows schematically a plan view from above of a lower portion of a blankholder according to the present invention.

As shown, for example, in FIGS. 5 and 6, the gripping surface 26 of the movable plates 24 may be a rectangle. According to alternative embodiments, the gripping surface 26 may be a square, a circle, an ellipse, or, for example, any combination of straight and/or curved sections.

Movable plates 24 may be arranged at regular intervals along the longitudinal direction X on the lower operating surface 22. For example, the movable plates 24 may be arranged in a number of four per meter, or in a different number depending on the construction shape of the movable plates 24.

According to a possible embodiment, the movable plates may be substantially rectangular, having a longitudinal dimension of approximately 200 mm and a transverse dimension of approximately 250 mm. Advantageously, the movable plates 24 may be spaced 50 mm apart. These measurements represent only one of the possible dimensional combinations of the constructional shape of the movable plates 24 and their spacing along the longitudinal direction X. Other combinations are possible depending on design requirements.

According to a possible embodiment, the lower gripping element comprises a guide jig 28 comprising a plurality of sliding seats 30, for example bushings, for a rod 34, at the end of which the movable plates 24 are arranged at the lower operating surface 22.

Figure 8:
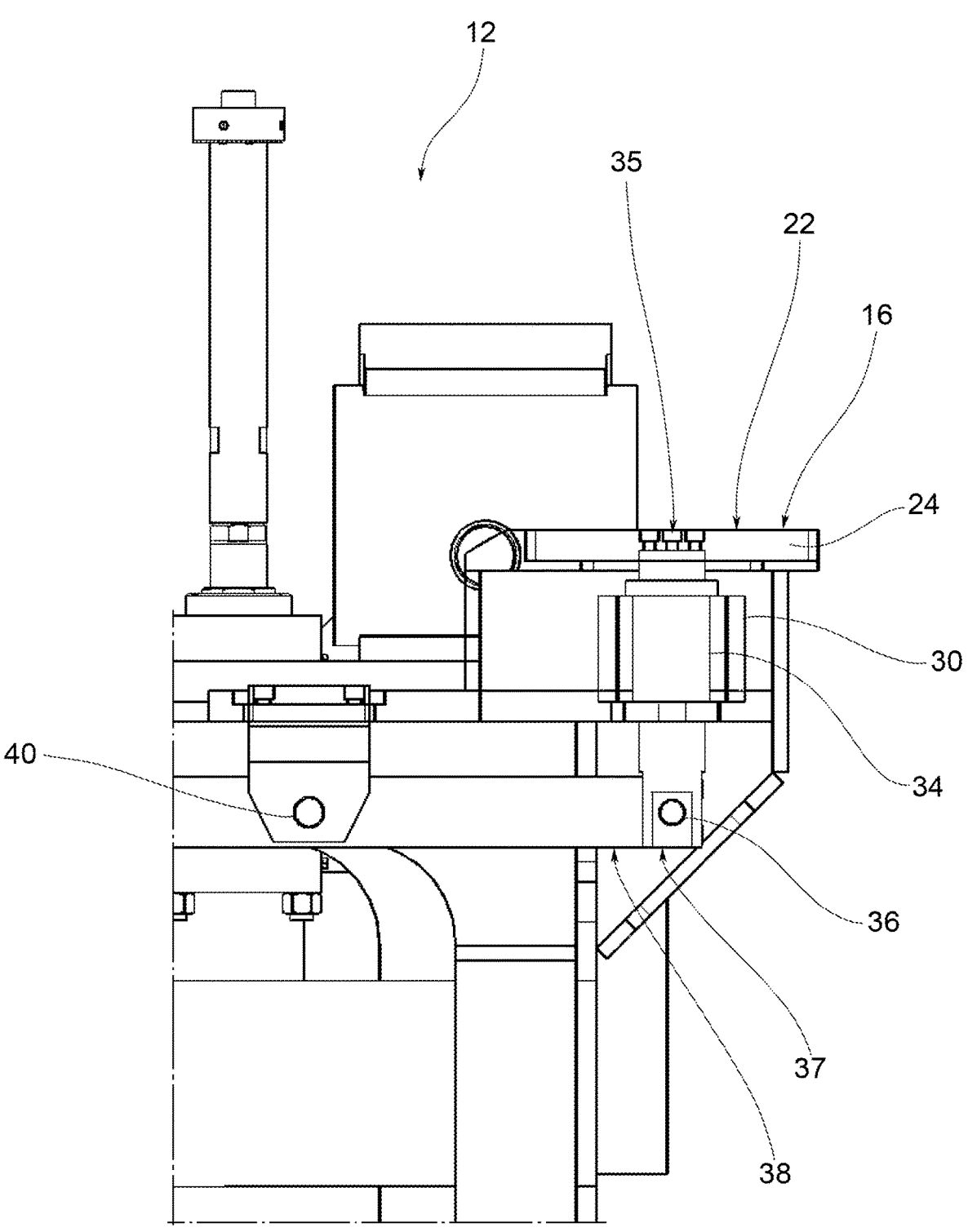
FIG. 8 shows schematically an enlarged portion of FIG. 7.

As shown in FIG. 8, the movable plate 24 may be connected to its rod 34 by a bolted connection 35.

Figure 7:
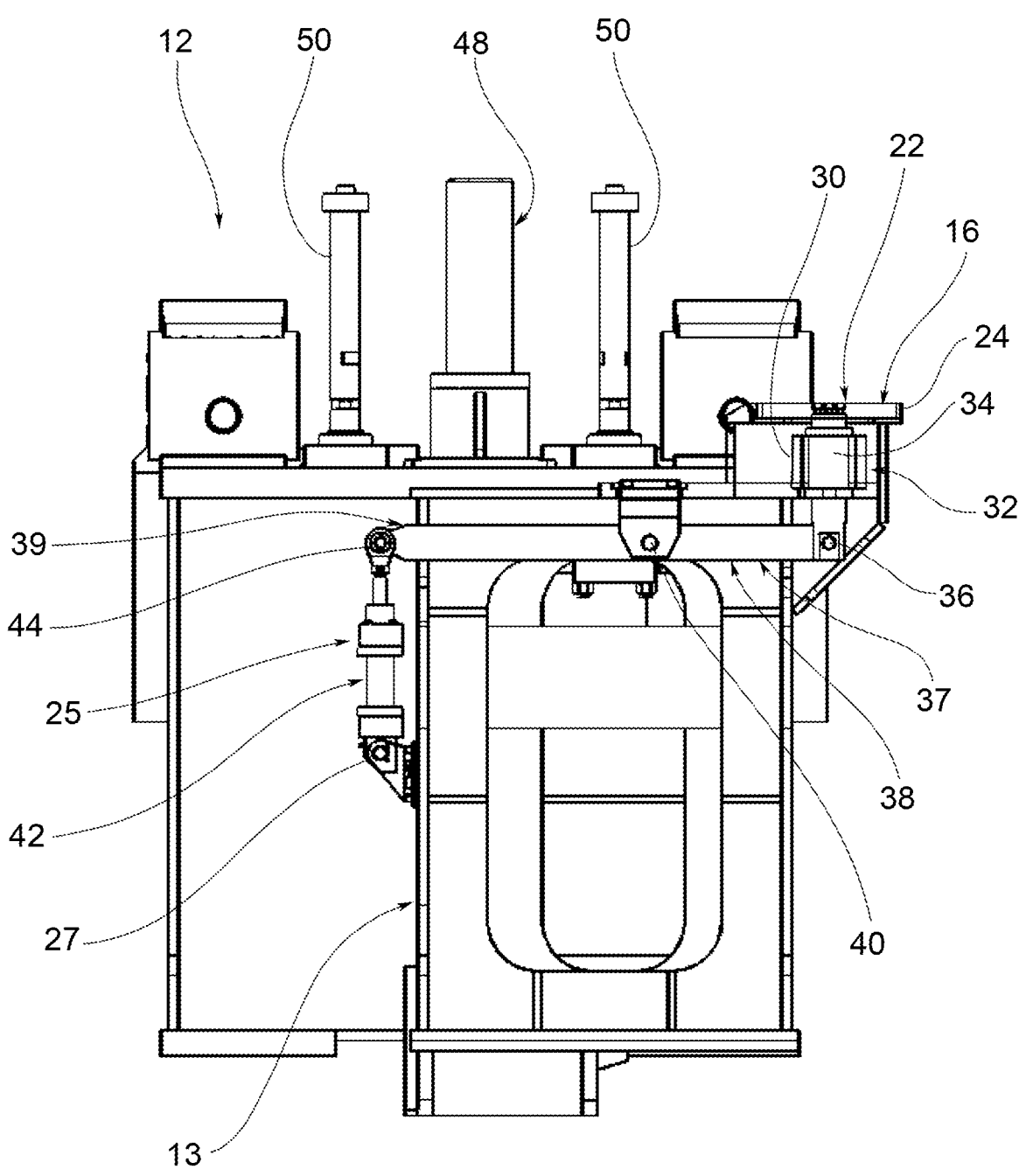
FIG. 7 shows schematically a cross-sectional side view of a lower portion of a blankholder according to the present invention.

According to a possible embodiment, each rod 34 may be arranged by means of a first end hinge 36 to a first end 37 of a rocker arm 38 according to a direction substantially perpendicular to the longitudinal direction X and having a fixed axis of rotation parallel to the longitudinal direction X, defined by a fixed central hinge 40, and a corresponding linear actuator 42 (which is shown in the example of FIG. 7) connected to a second end 39 of the rocker arm 38 by a second end hinge 44.

The linear actuator 42 that defines the position of the movable plate 24 connected thereto via the rocker arm 38 may be, for example, hydraulic, pneumatic, or electric.

As shown in FIG. 7, the linear actuator 42 may be anchored to the support frame 13 of the blankholder 12. According to a possible embodiment, the linear actuator 42 may be arranged on the support frame by an actuator hinge 27 such that during the actuation thereof, the actuator may rotate about the actuator hinge 27.

The technical solution just described, namely the actuation of the movable plates 24 by means of a rocker arm 38, makes it possible to move the actuation mechanism from underneath the lower gripping element 16 to an area away and clear of other mechanisms.

A first advantage is to move the linear actuator to a safe area away from where the panel clamping is done.

A second advantage concerns the ease of carrying out any ordinary or extraordinary maintenance operations on the handling members. In fact, the linear actuator is arranged in an easily accessible position because it is far from the area where the panels are actually picked up.

As mentioned above, the movable plates 24 are suitable to be moved independently of each other, due to the arrangement of independent handling members 25, to adapt to the shape of a panel, which, as in the example of the panel 18, presents a variable thickness in the longitudinal direction X. The variable thickness is represented by the composition of the panel 18 with the sheets 182 and 184.

Figure 1:
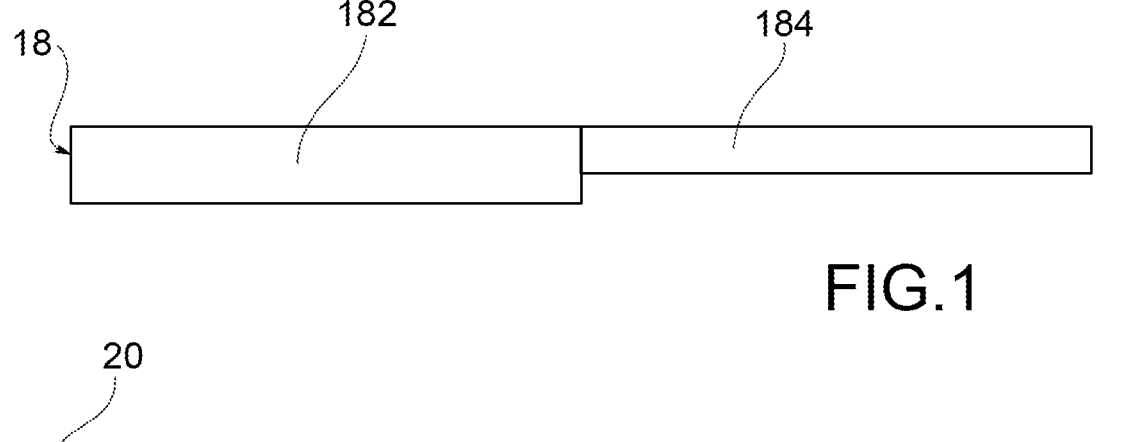
FIG. 1 shows schematically a front view of a first panel obtained by welding two panels having different thicknesses.
Figure 2:
FIG. 2 shows schematically a front view of a second panel having constant thickness.
Figure 3:
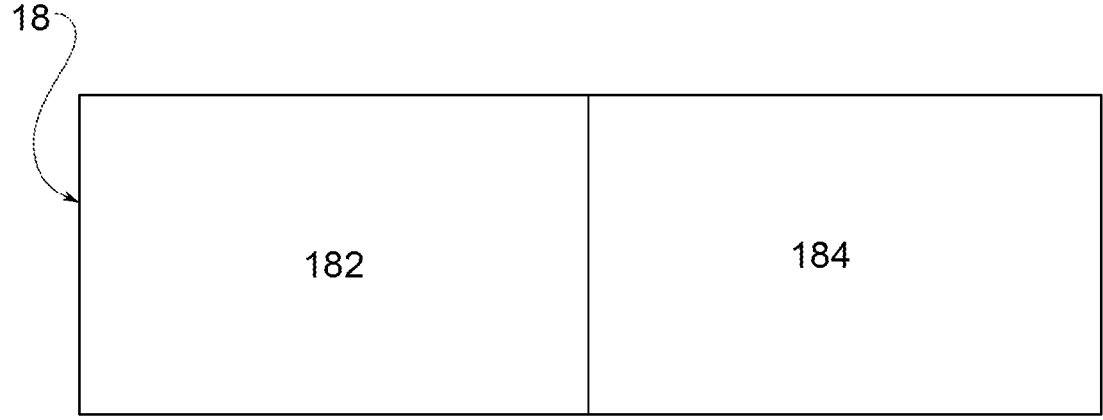
FIGS. 3 and 4 show plan views from above of the panel in FIG. 1 and the panel in FIG. 2, respectively.
Figure 4:

Thus, with reference to the panel shown in FIG. 1 resulting from welding two distinct sheets 182, 184, the blankholder 12 is suitable to shape itself to grip the edge of the panel 18 having two distinct thicknesses.

In this case, the movable plates 24, which in use will be at the thickness of the sheet 184, will protrude at a greater height than the movable plates 24 at the thickness of the sheet 182 which has a smaller thickness.

Figure 12:
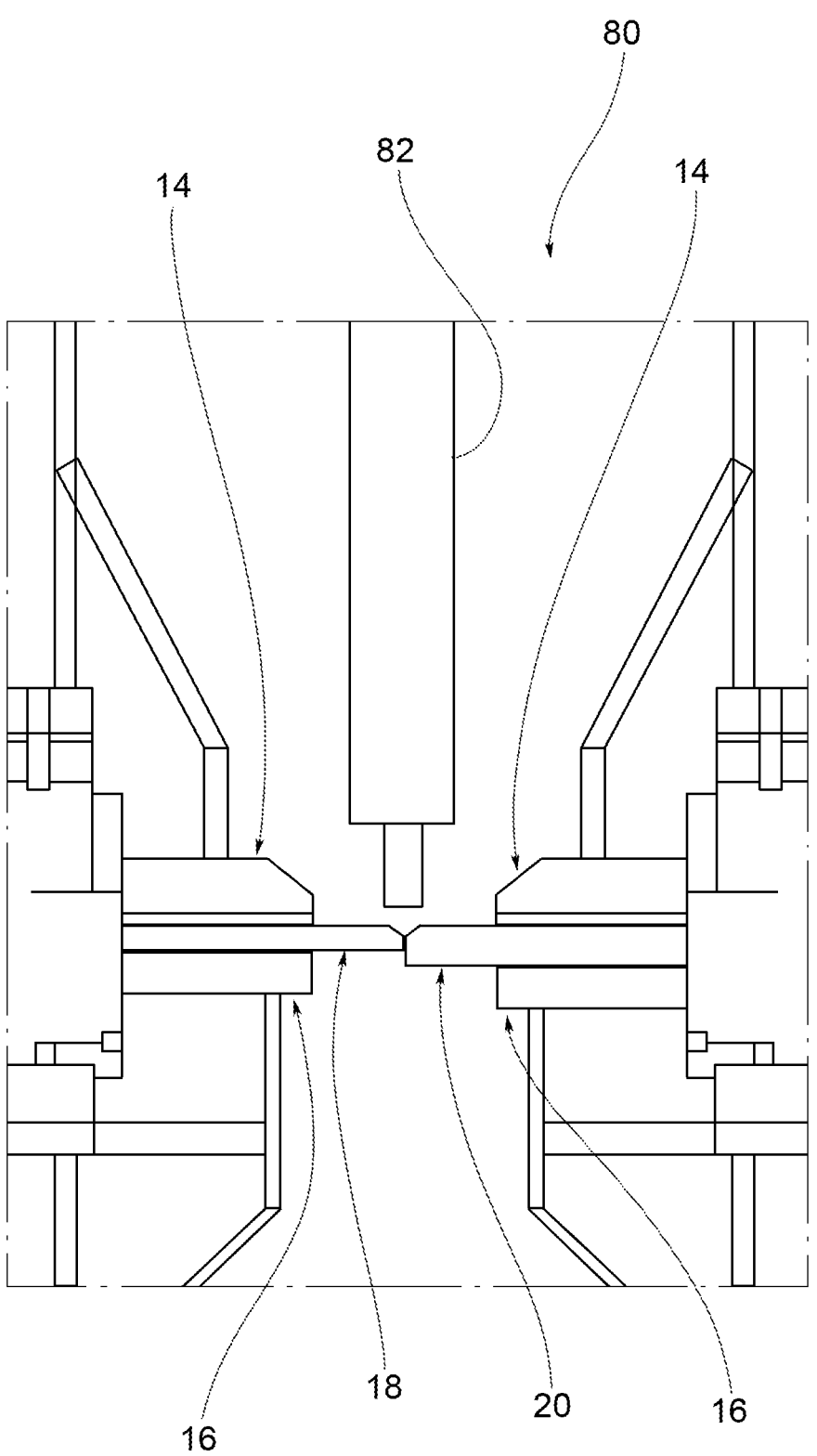
FIG. 12 shows schematically an enlarged side view of a welding apparatus comprising a blankholder according to a possible embodiment of the present invention.

In other words, the arrangement of the movable plates at the lower gripping element makes it possible to align the upper surfaces of the panels to be welded with each other, as shown for example in FIG. 12.

This description mainly refers to panels having two thicknesses; however, the blankholder of the present invention may also be successfully used with panels having more than two different thicknesses, for example three, four or more different thicknesses.

According to a possible embodiment, the blankholder 12 may comprise a programmable control unit 42, which is operatively connected to the handling members for actuating the handling members 25, and consequently automatically adjusting the height of the movable plates 24.

In other words, given the geometry of the input panel 18, 20, the height of the movable plates 24 may be adjusted accordingly in an automated manner.

As for the movement of the upper gripping element 14, it may be associated with blankholder handling means 46 comprising guide means 48 and linear actuators 50, 52.

Figure 10:
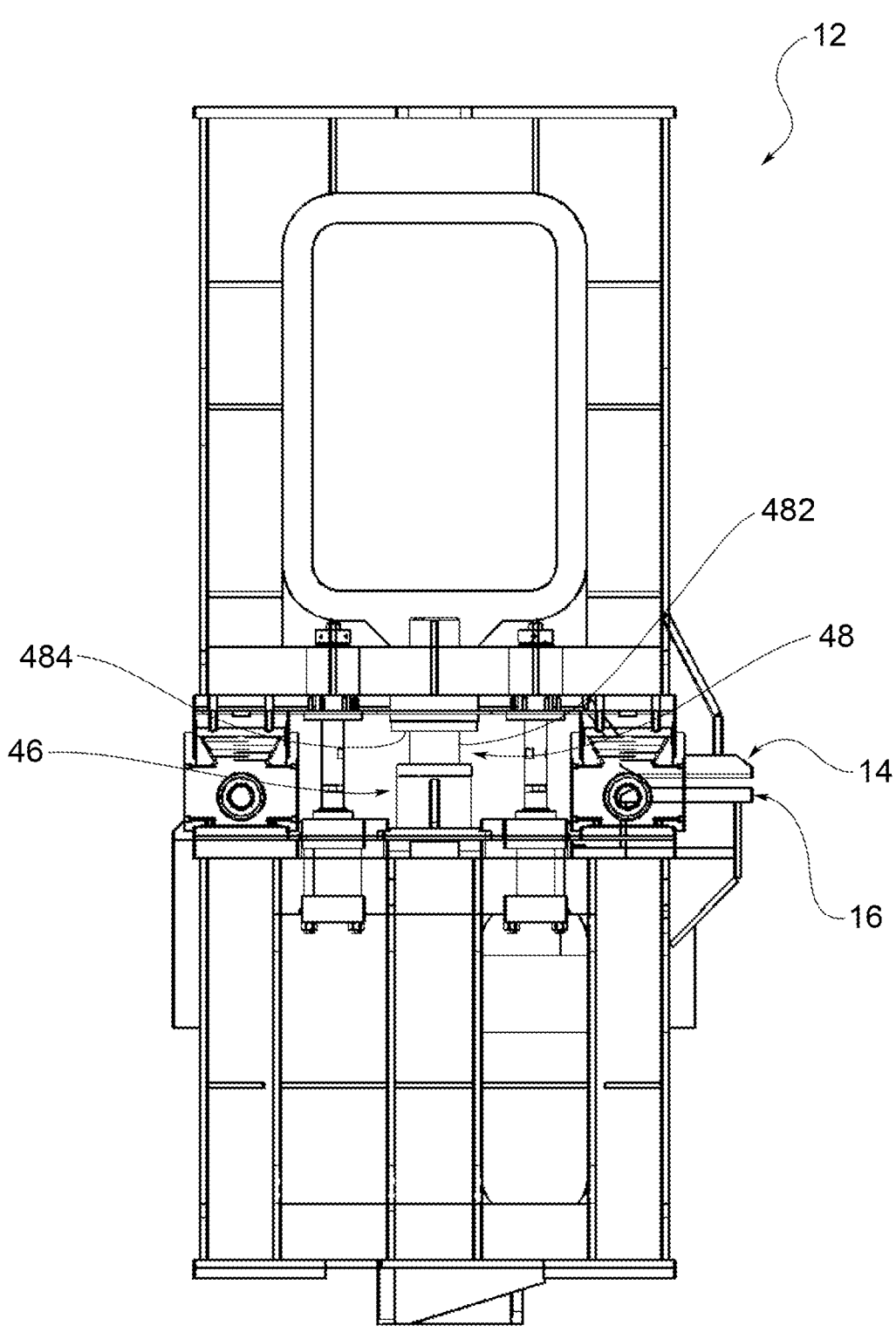
FIG. 10 shows schematically a cross-sectional side view of a blankholder according to the present invention.
Figure 11:
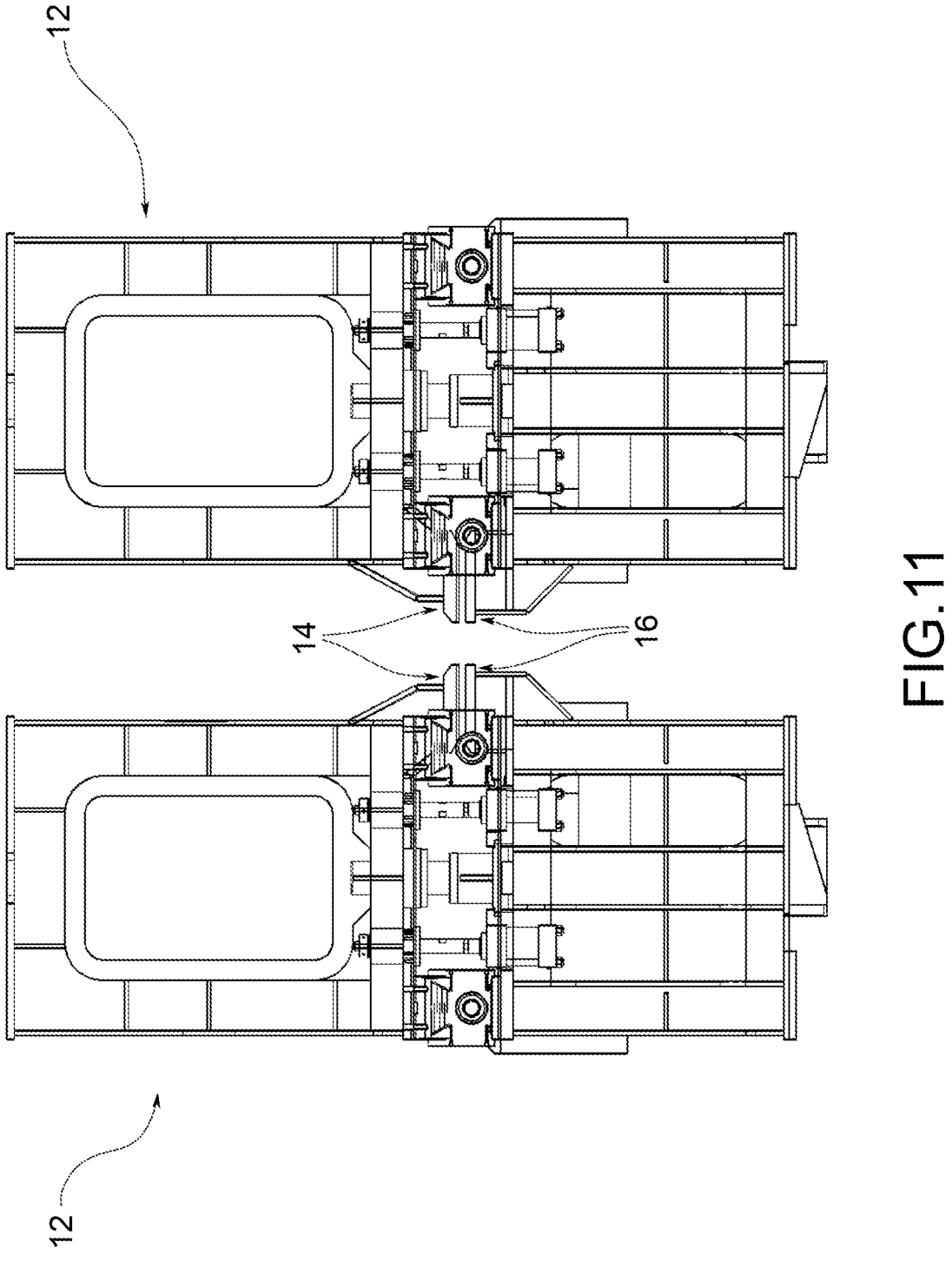
FIG. 11 shows schematically a cross-sectional side view of a first blankholder and a second blankholder, facing each other, both according to the present invention.

As shown in FIGS. 10 and 11, the blankholder handling means 46 may comprise guide means 48 comprising a guide pin 482 associated with each of the two ends of the upper gripping element 14, suitable to slide in a corresponding sliding seat 484.

According to a possible embodiment of the present invention, the guide pins 482 may be integral with the lower gripping element 16, and the sliding seats may be associated with the upper gripping element 14.

According to a possible embodiment, the blankholder handling means 46 may comprise a pair of linear actuators 50, 52 located at the ends of the upper gripping element 14 and the lower gripping element 16.

Advantageously, the pair of linear actuators 50, 52 may be placed on either side of the guide means 48 so that the guide means 48 are central to the linear actuators 50, 52.

The present invention further relates to a welding apparatus 80 comprising at least one welding head 82, and at least one blankholder 12 according to the foregoing.

Figure 13:
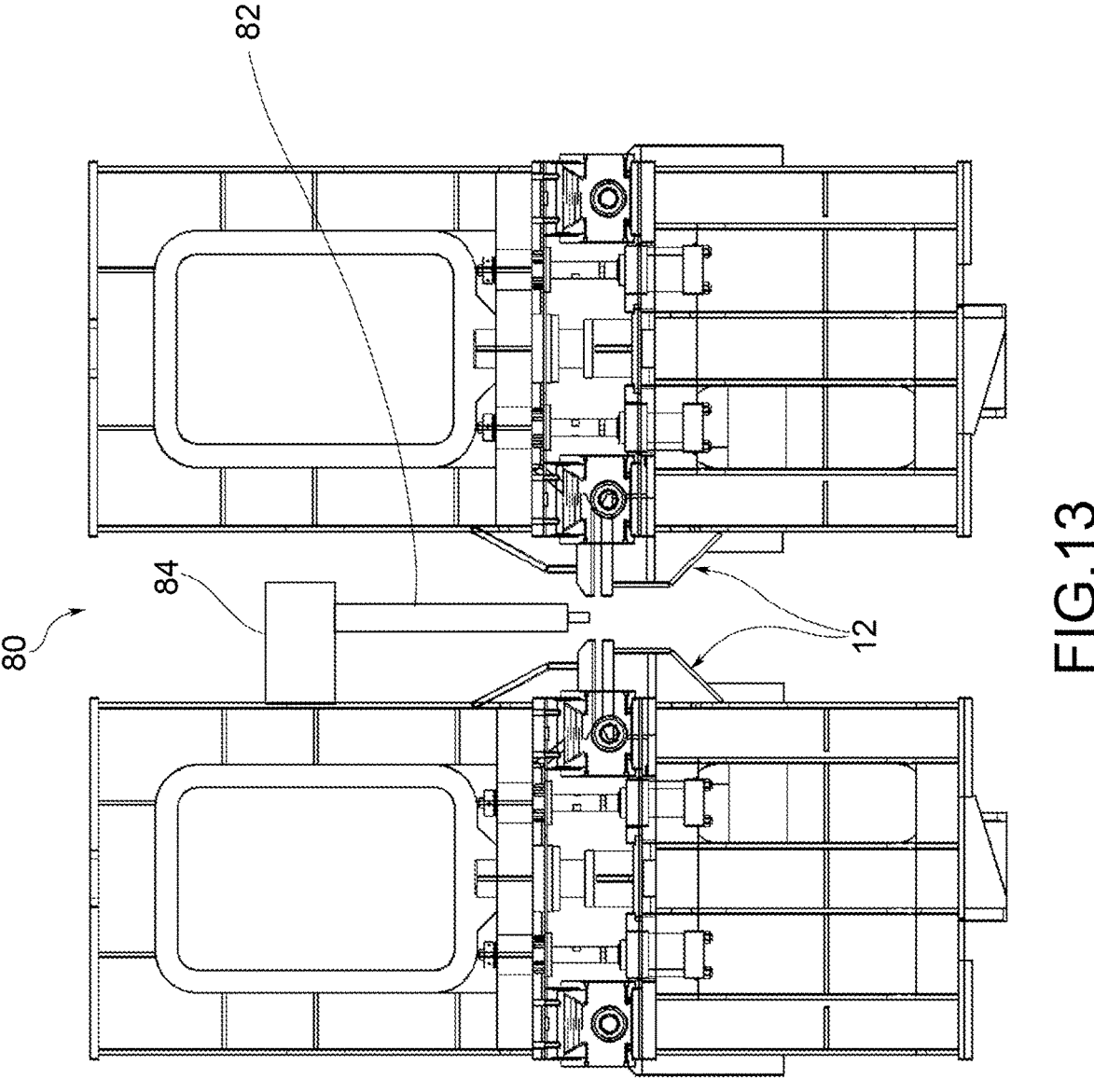
FIG. 13 shows schematically a side view of a welding apparatus according to a possible embodiment of the present invention.

A possible embodiment of a welding apparatus according to the present invention is shown, for example, in FIGS. 12 and 13.

The welding head may be of a known type, such as a laser welding head, a traditional welding head, MAG, TIG, or electrode.

According to a possible embodiment, which may be seen for example in FIG. 13, the welding head may be arranged on a movable trolley 84, suitable to slide on a respective guide 86 arranged at the structure of one of the two blankholders.

Thus, the advantages that may be achieved with the blankholder for a welding apparatus according to the present invention are apparent.

First, a blankholder has been provided that allows a panel with variable thickness to be clamped in place without the need for additional support structures.

In addition, a blankholder has been provided that may allow the opening and closing movement of the blankholder to be maintained at the lower gripping element only, while the upper gripping element remains fixed.

In addition, the blankholder according to the present invention makes it possible to automate the welding process even in the case of panels having different thicknesses.

A person skilled in the art may make modifications to the embodiments described above and/or substitute described elements with equivalent elements, in order to satisfy particular requirements, without departing from the scope of protection as described and claimed herein.

What is claimed is:

1. A blankholder for a welding apparatus, comprising an upper gripping element and a lower gripping element having longitudinal development along a longitudinal direction, said upper gripping element being movable between a closed position, in which a panel is clamped between said upper gripping element and said lower gripping element, and an open position in which the panel is slidable between said upper gripping element and said lower gripping element; said lower gripping element comprising a lower operating surface facing said upper gripping element;

wherein said lower gripping element further comprises a plurality of movable plates arranged along said longitudinal direction, said movable plates being suitable to be moved by handling members in a direction substantially perpendicular to said lower operating surface, between a first position in which the movable plates do not protrude or protrude by a minimum height relative to said lower operating surface, and a second position in which the movable plates protrude relative to said lower operating surface by a predetermined maximum height, said movable plates being arranged with a gripping surface along the longitudinal direction.

2. The blankholder of claim 1, wherein in the first position, said gripping surface of said movable plates is substantially aligned with said lower operating surface of said lower gripping element.

3. The blankholder of claim 1, wherein said gripping surface of said movable plates is a rectangle.

4. The blankholder of claim 1, wherein said movable plates are arranged at regular intervals along the longitudinal direction on said lower operating surface.

5. The blankholder of claim 1, wherein said lower gripping element comprises a guide jig, comprising a plurality of sliding seats for a rod at the end of which said movable plates are arranged at said lower operating surface.

6. The blankholder of claim 5, wherein the rod is arranged by a first end hinge at a first end of a rocker arm according to a direction substantially perpendicular to said axis the longitudinal direction and having a fixed axis of rotation parallel to the longitudinal direction, defined by a fixed central hinge, and by a corresponding linear actuator connected to a second end of said rocker arm by of a second end hinge.

7. The blankholder of claim 6, wherein the linear actuator is of hydraulic, pneumatic, or electric type.

8. The blankholder of claim 1, wherein the movable plates are adapted to be moved independently of each other, to adapt to a shape of the panel.

9. The blankholder of claim 1, characterized in that it wherein the blankholder comprises a programmable control unit, operatively connected to said handling members, for actuating said handling members, and consequently adjusting height of said movable plates.

10. The blankholder of claim 1, wherein the upper gripping element is associated with blankholder handling means comprising guide means and linear actuators.

11. A welding apparatus comprising at least one welding head and a blankholder according claim 1.

12. The welding apparatus of claim 11, wherein the welding head welding head, a traditional welding head, a metal active gas (MAG) welding head, a tungsten inert gas (TIG) welding head, or an electrode welding head.

* * * * *